Figure 1:
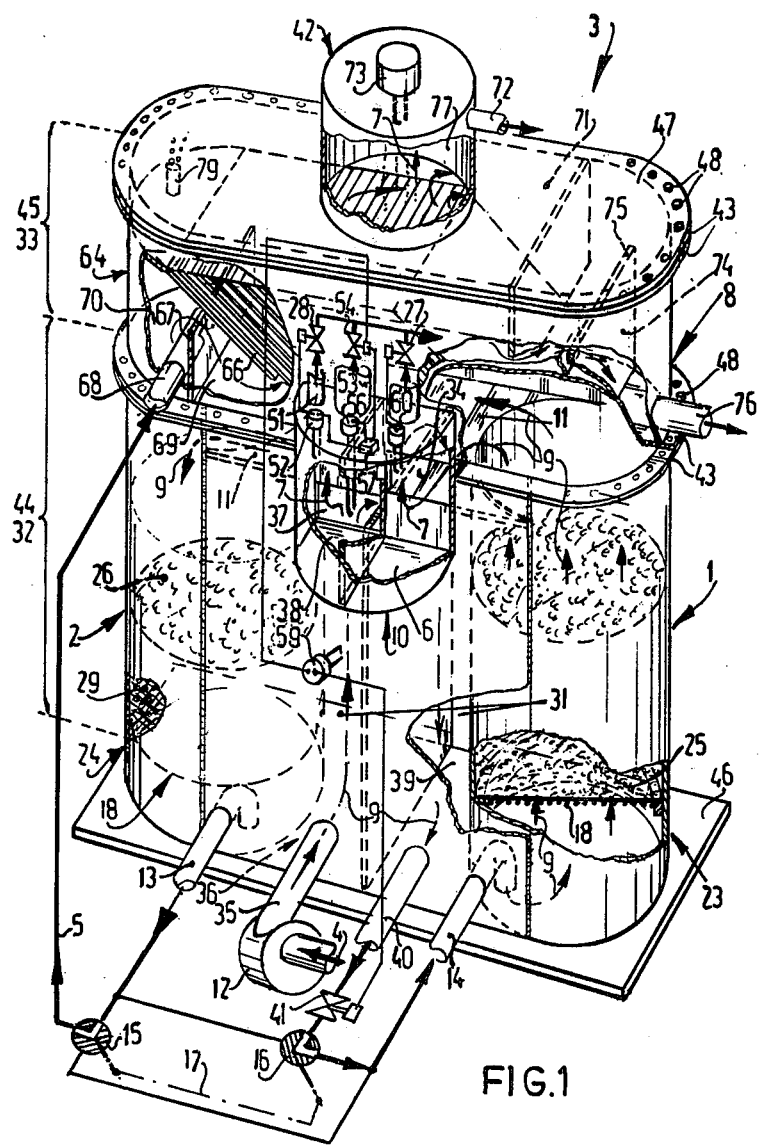

United States Patent [19]

Verpalen et al.

[11] 4,265,759

[45] May 5, 1981

[54] DEVICE FOR SEPARATING A MIXTURE

[75] Inventors: Willem A. Verpalen; Theodorus A. J. Koot, both of Nieuwegein, Netherlands

[73] Assignees: Ballast-Nedam Groep N.V., Amsterdam; Skimovex B. V., Utrecht, both of Netherlands

[21] Appl. No.: 123,028

[22] Filed: Feb. 20, 1980

Related U.S. Application Data

[63] Continuation of Ser. No. 11,693, Feb. 12, 1979, abandoned.

[30] Foreign Application Priority Data

Feb. 14, 1978 [NL] Netherlands .......................... 7801685

[51] Int. Cl.³ ............................................ B01D 23/10
[52] U.S. Cl. .................................... 210/261; 210/262; 210/265; 210/266; 210/284; 210/300; 210/307; 210/310; 210/317; 210/320; 210/336
[58] Field of Search .................. 210/23 R, 73 W, 253, 210/261, 262, 266, 284, 299, 340, 341, 345, 259, 265, 275, 277, 285, 286, 300, 305, 307, 310, 311, 312, 317, 320, 335, 336

[56] References Cited

U.S. PATENT DOCUMENTS

| | | | |
|---|---|---|---|
| 1,574,170 | 2/1926 | Rosenav | 210/262 |
| 2,598,988 | 6/1952 | Glascow | 210/23 R |
| 3,339,736 | 9/1967 | Muller | 210/262 |
| 3,558,482 | 1/1971 | De Young | 210/23 R |
| 3,797,666 | 3/1974 | Nakanishi et al. | 210/265 |
| 3,933,654 | 1/1976 | Middelbeek | 210/521 |
| 3,966,603 | 6/1973 | Grant | 210/86 |
| 4,145,280 | 3/1979 | Middelbeek et al. | 210/20 |
| 4,162,973 | 7/1979 | Lynch | 210/73 W |

FOREIGN PATENT DOCUMENTS 934625  8/1963  United Kingdom ..................... 210/284

Primary Examiner—Charles N. Hart
Assistant Examiner—David R. Sadowski
Attorney, Agent, or Firm—Diller, Ramik & Wight

[57] ABSTRACT

A device for separating a mixture of, for example, oil and water consists of a number of elements treating the mixture in stages, said elements being arranged in overlying position in order to manufacture a compact device.

8 Claims, 5 Drawing Figures

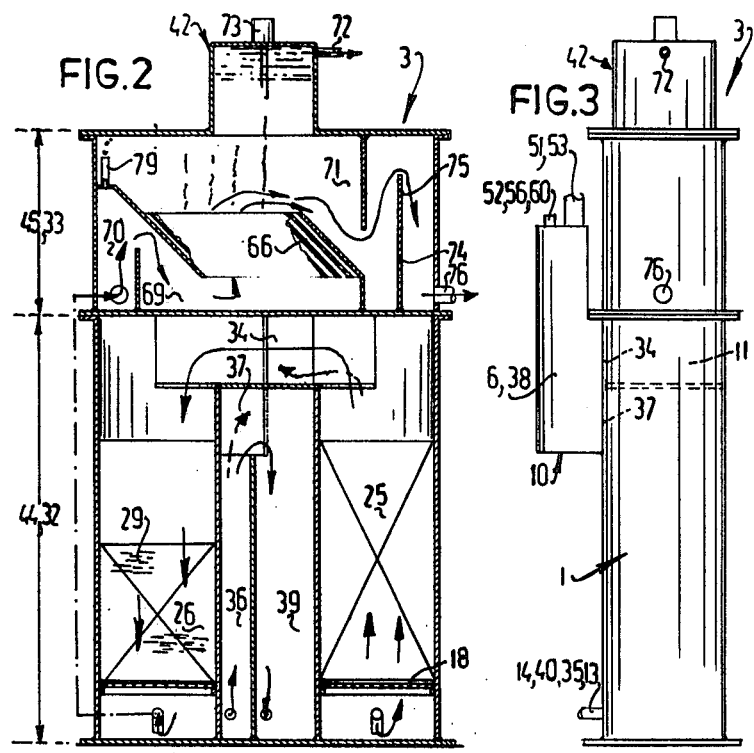
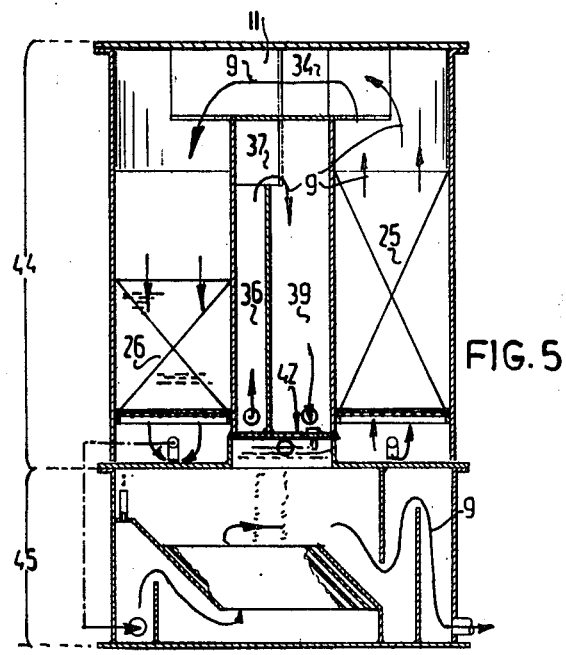

DEVICE FOR SEPARATING A MIXTURE

This is a continuation of application Ser. No. 011,693, filed Feb. 12, 1979, now abandoned.

The invention relates to a device for separating a mixture of a carrier medium and at least one substance which is insoluble therein, for example, water and oil, said device essentially comprising a pre-separator, an intermediate separator and a post-separator, said intermediate separator comprising at least one first filter element containing a packet of filter material and at least one second filter element containing a packet of filter material and being located at the same level as the first filter element, a mixture feed communicating with the pre-separator space, a carrier medium passage communicating with the post-separator and at least one substance collecting space, in which the first and the second filter elements communicate with one another through a conduit guiding the mixture along the collecting space, the mixture feed can be alternately connected with the inlet of the first and with that of the second filter element treating the mixture with non-compacted filter material and the carrier medium passage can be alternately connected through commutatable connecting means on the one hand with the outlet of the first and with that of the second filter element filtering the mixture stream with compacted filter material and is connected on the other hand with the inlet of a post-separator comprising a packet of plates and provided with a carrier medium outlet.

A similar device is proposed in Dutch Pat. application 7611378.

The invention provides a compact device of the kind set forth, which is characterized in that the post-separator and the intermediate separator are arranged in overlying position. This device has such a compactness, that it is particularly suitable for use on board ships as an oil-water separator.

The post-separator is preferably disposed on top of the intermediate separator.

A particularly compact device is obtained by arranging the pre-separator at the same level as and, in particular, between the filter elements of the intermediate separator.

Overload of the device in the event of an excessive feed of substance can be avoided by providing the pre-separator with a first substance outlet having a low flow rate and with a second substance outlet of high flow rate closed by a closing member, which is subjected to a calamity sensor.

The above-mentioned and further features of the invention will be set forth with reference to a drawing.

Figure 4:
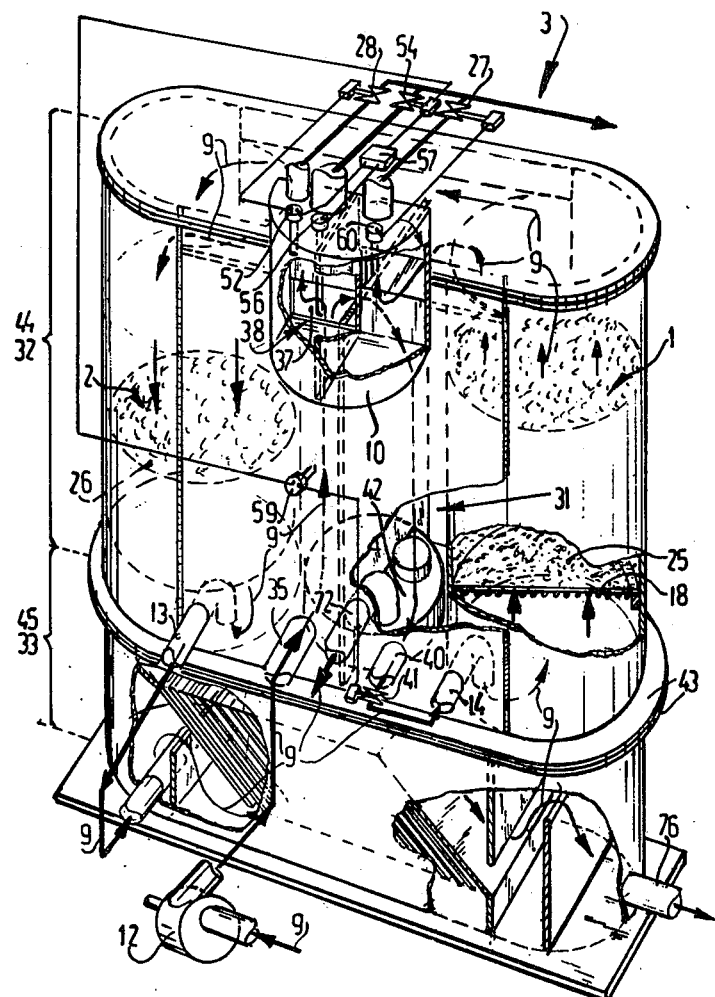

The drawing shows schematically in:

FIGS. 1 and 4 each a perspective view partly broken away of different, preferred embodiments of the device in accordance with the invention, FIG. 2 a longitudinal sectional view of the device of FIG. 1, FIG. 3 a side elevation of the device of FIG. 2, and FIG. 5 a longitudinal sectional view of the device of FIG. 4.

The device 3 of FIGS. 1 to 3 essentially arranged in a compact housing 8 for separating a carrier medium, for example, water from light-weight substances 7, for example, light oil contained therein mainly comprises a pre-separator 31, an intermediate separator 32 and a post-separator 33.

The housing 8 comprises a bottom 46 and a cover 47 and is divided into two compartments 44 and 45 interconnected in overlying position by flanges 43 and bolts 48 in a releasable manner so that it is readily accessible.

The pre-separator 31 and the intermediate separator 32 are arranged in the same compartment 44 and the post-separator 33 is accommodated in the compartment 45.

A feeding conduit 35 communicating with a pump 12 conveys a mixture of carrier medium and light substance below into a riser channel 36 of the pre-separator 31, which communicates at the top through a passage 37 with a collecting space 38 for light substance 7 arranged in an extension 10 of the housing 8. The top end of the riser channel 36 communicates with a down channel 39 of the pre-separator 31 arranged at the side of the riser. The outlet 40 provided with a closing member 41 at the lower end of the down channel 39 communicates with the intermediate separator 32.

The pre-separator 31 serves to separate the very readily separable light substance 7 contained in the mixture in the form of large drops or lumps. This light substance 7 is collected in the collecting space 38 and removed through a substance outlet 51 when the closing member 28 is opened under the action of a sensor 52 monitoring the light substance 7. The flow to be removed by the substance outlet 51 is small as compared with the flow of mixture to be conveyed by the pump 12 so that the substance outlet 51 and the closing member 28 have small dimensions. The pre-separator 31 has furthermore to ensure that a mixture having a very high percentage of light substance 7 should not enter the intermediate separator 32. For this purpose the collecting space 38 has a further substance outlet 53 with a closing member 54, the passage of which is as spacious as the passage of the mixture feeding conduit 35. The closing member 54 is opened under the action of a substance sensor 56, which is connected like the substance sensor 52 to a clock 57 which measures the period of time between the instants at which the substance-water interface drops between the substance sensors 52 and 56. If this period of time is lower than a value set in the clock 57, the closing member 54 is opened so that a large flow of light substance 7 evacuated until the substance sensor 52 detects water. Apart from the calamity sensor formed by said elements 52, 56, 57 measuring the velocity of the level variation of the interface of water and substance the pre-separator 31 has a further calamity sensor, that is to say, a substance sensor 59, which upon the detection of a large amount, for example 80% or 100% of light substance 7 in the pre-separator 31, closes the closing member 41 and, as the case may be, simultaneously opens the closing member 54. The pre-separator 31 is arranged between the filter elements 1 and 2 positioned in the compartment 44 at the same level in the intermediate separator 32, which furthermore has a mixture inlet 4, a carrier medium passage 5 and a collecting space 6 for light substances 7. The filter elements 1 and 2 communicate with one another through a conduit 11, with which communicates through a passage 34 the collecting space 6 arranged in the lateral extension 10 at the side of the collecting space 38.

The outlet of the pre-separator 31 can be alternately connected with the passages 14 or 13 of the filter elements 1 and 2 respectively of the intermediate separator 32 through commutatable connecting means comprising a three-way cock 16. The outlet of the carrier medium passage 5 can be alternately connected with the passages 13 and 14 of the filter elements 2 and 1 respectively through commutatable connecting means comprising a three-way cock 15, which is actuated simultaneously with the three-way cock 16 by the actuating rod 17. In the position shown of the three-way cocks 16 and 15 the passage 14 constitutes an inlet and the passage 13 an outlet, whereas in the changed-over position the passage 14 forms an outlet and the passage 13 an inlet. The filter elements 1 and 2 comprise each a holder 23 and 24 respectively, said holders being filled with packets of filter material 25 and 26, preferably sand supported by a grating 18.

The separation of the flow of mixture supplied through the mixture feed 4 is carried out in the intermediate separator 32 in three stages, that is to say, a first stage in which the flow of mixture is passed for coalescence or conglomeration of substance 7 through a packet of moving filter material 25 in the filter element 1, a second stage in which the flow of mixture is guided along the collecting space 6 and the substance 7 coalesced or conglomerated in the first stage is separated out of the mixture by the gravity segregation and a third stage in which the mixture stream treated in the preceding stages is passed through a compacted further packet of filter material 26 in the filter element 2 filtering out the remainder of the substance 7, said packets of filter material 25, 26 being alternately employed for treating the mixture stream in the first and the third stages. Referring to FIGS. 1 and 2 the filter material 25 of filter element 1 is moving, whereas the filter material 26 of filter element 2 is compacted by the flow of the mixture in the direction indicated by arrows in FIG. 1 and the reversal of the direction of flow is performed by the actuating rod 17. Referring to FIG. 1, the mixture flows through the pump 12, the opened closing member 16, the passage 14 and the grating 18 upwards through the packet of filter material 25 consisting, for example, of fibres or grains. The latter thus become detached from one another and provide ample passage for the mixture together with the substance 7 captured in this filter material. Moreover, the violent movements of the fibres or grains impart to the substance particles a high probability of collision, which is conducive to the coalescence or the conglomeration. The filter element 1 is then in the coalescing phase. This filter element 1 is then in addition in a flushing phase because the mixture stream flushes in addition the filter material 25 of the filter element 1, thus releasing the substance 7 previously captured in this filter material 25 and conveying it along. The mixture charged with this additional substance 7 flows through the conduit 11 and along the passage 34 and thus along the collecting space 6 towards the second filter element 2. During the second stage in the conduit 11 the large flakes and/or drops of substance 7 separate out by gravity segregation, whereas the small particles of the substance 7 are carried along with the carrier medium towards the filter element 2. During the third stage the mixture stream flows through the filter element 2 in downward direction so that the filter material 26 is compacted and gets into the filtering phase. The small particles of the substance 7 are filtered out indicated as a pollution 29 of the filter element 2. The substance 7 coalesces into large flakes and/or drops. Through the grating 18, the passage 13, the three-way cock 15 and the carrier medium passage 5 the carrier medium purified in the intermediate separator 32 enters the post-separator 33. When the three-way cocks 15 and 16 have changed positions, the filter element 1 is in the filtering phase and the filter element 2 in the coalescing phase. For draining the substance 7 the closing member 27 is opened under the action of a substance sensor 60.

The post-separator 33 is arranged in line above the intermediate separator 32 and has essentially the same horizontal cross-section. This post-separator 33 serves for separating the water emanating from the intermediate separator 32 from the water-insoluble light substances, for example, oil, still contained therein. The post-separator 33 comprises a reservoir 64 for receiving a mixture of water and substances and a plurality of inclined separating channels 66 disposed parallel to and one after the other arranged in said reservoir 64 and bounded by channel walls 67, a mixture inlet 68 opening out in an inlet chamber 69 and dividing the mixture at right angles to the plane of the drawing, a feeding chamber 70 communicating with the inlet chamber 69, a substance outlet 72, an interface sensor 73, an overflow 74 with an overflow rim 75, a water outlet 76 communicating with the overflow 74 and a screen 78 separating the overflow 74 and a collecting space 77 for light substances 7. The packet of separating channels 66 is arranged between the feeding chamber 70 and an outlet chamber 71 of the reservoir 64. The collecting space 77 is arranged in a dome 42. The feeding chamber 70 communicates through a narrow conduit 79 with the collecting space 77.

Contrary to FIGS. 1 to 3 of post-separator 33 of the device 3 shown in FIGS. 4 and 5 is arranged beneath the pre-separator 31 and the intermediate separator 32, whilst the dome 42 is located between the filter elements 1 and 2 of the intermediate separator 32 and beneath the pre-separator 31. The operation and the construction of the device 3 of FIGS. 4 and 5 is otherwise identical to that of FIGS. 1 to 3.

In all Figures the arrows 9 indicate the direction of flow of the mixture and the carrier medium respectively with the position shown of the three-way cocks 15 and 16.

What we claim is:

1. A device for separating a mixture of a carrier medium and at least one substance which is insoluble therein, for example, water and oil, said device comprising, in combination:

a housing having a top and a bottom and an intermediate wall sealing the interior of the housing into upper and lower compartments;

intermediate separator means in one of said compartments and post-separator means for promoting the separation of said mixture in the other of said compartments; said intermediate separator means comprising a first vertically elongate chamber having a bed of particulate filter material therein and a second vertically elongate chamber having a bed of particulate filter material therein, each such chamber terminating at its upper end at the same level within said housing, conduit means communicating said upper ends of the two chambers, the conduit means comprising the upper portion of the compartment in which said intermediate separator means is located and a horizontally extending partition within said housing bridging the upper ends and said first and second chamber, and there being first collection means in lateral communication with said conduit means at a point intermediate said first and second chambers, said collector means comprising a further chamber exterior to said housing laterally displaced and extending above said conduit means.

2. A device as claimed in claim 1 having pre-separator means in the same compartment as said intermediate separator means, said pre-separator means comprising a third vertical elongate chamber divided by a vertical partition intermediate said first and second chambers and extending upwardly from the bottom of said same compartment to a height spaced below said horizontal partition, and there being second collection means in lateral communication with said third chamber at a point between the top of said vertical partition and below said horizontal partition, said second collection means comprising a chamber exterior to said housing laterally displaced and extending above said third chamber.

3. A device as claimed in claim 2 wherein said first and second collection means comprise two side-by-side chambers within a single wall having common upper and lower ends.

4. A device as claimed in anyone of claims 1-3 wherein said post-separator comprises at least two inclined parallel plates spaced from each other within said other compartment and there being a third collection means above the parallel plates.

5. A device for separating immiscible liquids, for example oil and water, one of which is lighter than the other, comprising in combination:
 a housing having a top and a bottom and an intermediate wall sealing the interior of the housing into upper and lower compartments;
 a pre-separator means and an intermediate separator means in one of said compartments and a post-separator for promoting the separation of said immiscible liquids in the other compartment;
 said intermediate separator means comprising first and second vertically elongate chambers each having a bed of particulate filter material therein and said pre-separator means comprising at least a pair of vertically elongate chambers disposed in side-by-side relationship between said first and second chambers, said chambers of the pre-separator means being in communication at their upper portions and there being means for introducing a mixture of the liquids into the lower portion of one of such chambers and for withdrawing liquid from the lower portion of the other of such chambers whereby a unidirectional flow path is created through such chambers whereby some of the lighter liquid tends to collect at the upper portions of such chambers;
 means for directing liquid from the pre-separator means alternately to the bottom of one of said first and second chambers while withdrawing liquid from the other of such chambers, and vice versa, and there being conduit means within said housing communicating the upper portions of said first and second chambers whereby a flow path is created through said first and second chambers in which one of said filter beds is expanded by the flow while the other is compacted by the flow, and vice versa dependent upon the direction of flow, whereby the lighter liquid coalesced by the expanded bed tends to collect in said conduit means; and
 collection means for collecting the lighter liquid from said conduit means and from said upper portions of the pre-separator means chambers, said collection means comprising separate collection chambers in lateral communication respectively with said conduit means and with said upper portions of the pre-separator means chambers.

6. A device a defined in claim 5 wherein said post-separator means includes a series of inclined plates, the fluid outlet from said intermediate separator means being connected to said post-separator means.

7. A device as defined in claim 5 wherein said post-separator means is located within said upper compartment.

8. A device as defined in claim 5 wherein said post-separator means is located within said lower compartment.

* * * * *